United States Patent
Grubb et al.

(10) Patent No.: US 10,941,647 B2
(45) Date of Patent: Mar. 9, 2021

(54) MATRIX TEMPERATURE PRODUCTION LOGGING TOOL AND USE

(71) Applicant: ConocoPhillips Company, Houston, TX (US)

(72) Inventors: Scott A. Grubb, Houston, TX (US); Kyle Friehauf, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 16/659,102

(22) Filed: Oct. 21, 2019

(65) Prior Publication Data

US 2020/0116011 A1    Apr. 16, 2020

Related U.S. Application Data

(63) Continuation-in-part of application No. 14/791,792, filed on Jul. 6, 2015, now abandoned.

(60) Provisional application No. 62/021,441, filed on Jul. 7, 2014.

(51) Int. Cl.
*E21B 47/07* (2012.01)
*G01F 1/684* (2006.01)

(52) U.S. Cl.
CPC .............. *E21B 47/07* (2020.05); *G01F 1/684* (2013.01)

(58) Field of Classification Search
CPC .................................. E21B 47/07; G01F 1/684
USPC ........................................................ 73/152.12
See application file for complete search history.

(56) References Cited

U.S. PATENT DOCUMENTS

| | | |
|---|---|---|
| 2,983,586 A | 5/1961 | Blanchard |
| 3,076,334 A | 2/1963 | Wiley |
| 3,714,832 A | 2/1973 | Howell et al. |
| 3,874,232 A | 4/1975 | Hardison |
| 4,074,756 A | 2/1978 | Cooke, Jr. |
| 4,109,717 A | 8/1978 | Cooke, Jr. |
| 4,435,978 A | 3/1984 | Glatz |
| 4,547,080 A | 10/1985 | Dunn et al. |
| 4,811,598 A | 3/1989 | Diller et al. |
| 4,974,446 A * | 12/1990 | Vigneaux ............... G01N 22/04 73/152.42 |
| 5,226,333 A | 6/1993 | Hess |
| 5,251,479 A | 10/1993 | Siegfried, II et al. |

(Continued)

FOREIGN PATENT DOCUMENTS

JP          56160679 A  *  12/1981  ............... G01V 9/02

*Primary Examiner* — John Fitzgerald
(74) *Attorney, Agent, or Firm* — Boulware & Valoir

(57) ABSTRACT

A matrix production logging tool for measuring the temperature of produced fluids in a wellbore is described. Accurate production allocation to the pathways between the oil/gas well and the reservoir provides required data for the economic optimization of the techniques and procedures used to complete future wells and optimize the existing well. The low maintenance tool provides precise uphole, downhole and inflow temperature measurements of produced fluids within the wellbore. These are obtained at a plurality of locations along the oil/gas well as the tool is withdrawn, thus providing a matrix of temperature measures along the length of the well. From the temperature traces, inflow as well as up and downhole temperature, can be determined, and mass contribution at each inlet determined. With this method, a production profile along the entire well can be determined as used in further well optimization efforts.

16 Claims, 17 Drawing Sheets

(56) References Cited

U.S. PATENT DOCUMENTS

| | | | |
|---|---|---|---|
| 5,302,781 A | 4/1994 | Hanson, III | |
| 5,353,873 A | 10/1994 | Cooke | |
| 5,415,037 A | 5/1995 | Griston et al. | |
| 5,509,474 A | 4/1996 | Cooke, Jr. | |
| 5,551,287 A | 9/1996 | Maute et al. | |
| 5,574,263 A | 11/1996 | Roesner | |
| 5,610,331 A * | 3/1997 | Georgi | E21B 47/10 73/152.18 |
| 5,631,413 A | 5/1997 | Young et al. | |
| 5,736,637 A | 4/1998 | Evans et al. | |
| 6,028,307 A | 2/2000 | Young et al. | |
| 6,176,129 B1 | 1/2001 | Aguesse et al. | |
| 7,114,386 B1 | 10/2006 | Veignat et al. | |
| 7,784,339 B2 | 8/2010 | Cook et al. | |
| 9,874,087 B2 | 1/2018 | Jay et al. | |
| 10,294,771 B2 * | 5/2019 | Donzier | E21B 47/01 |
| 2004/0083804 A1 | 5/2004 | Maute | |
| 2010/0212891 A1 | 8/2010 | Stewart et al. | |
| 2012/158307 A1 | 6/2012 | Jay et al. | |
| 2013/0091942 A1 | 4/2013 | Samson et al. | |
| 2013/0268198 A1 | 10/2013 | Nyhavn | |
| 2013/0333879 A1 * | 12/2013 | Rasheed | E21B 49/00 166/250.1 |
| 2016/0003032 A1 * | 1/2016 | Grubb | E21B 47/07 73/152.12 |
| 2016/0130935 A1 * | 5/2016 | Manzar | E21B 47/01 166/250.01 |
| 2017/0016315 A1 * | 1/2017 | Madasu | G06F 17/11 |
| 2018/0003027 A1 * | 1/2018 | Donzier | E21B 17/1021 |
| 2018/0266238 A1 * | 9/2018 | Livescu | E21B 47/12 |
| 2019/0120042 A1 * | 4/2019 | Doraiswamy | G01V 9/02 |
| 2020/0208514 A1 * | 7/2020 | Swett | E21B 17/1021 |

* cited by examiner

| M | MASS RATE |
| --- | --- |
| T | TEMPERATURE |
| $T_{down}$ | TEMPERATURE DOWNHOLE OF PERFORATION |
| $T_{in}$ | T INFLOW AT PERFORATION |
| $T_{up}$ | T UPHOLE OF PERFORATION |

$M_{in}/M_{up} = (T_{down} - T_{up})/(T_{down} - T_{in})$ $M_{in}/M_{up} = (100-80)/(100-20)$ $M_{in}/M_{up} = (20)/(80)$ $M_{in}/M_{up} = 1/4$

FIG. 6D

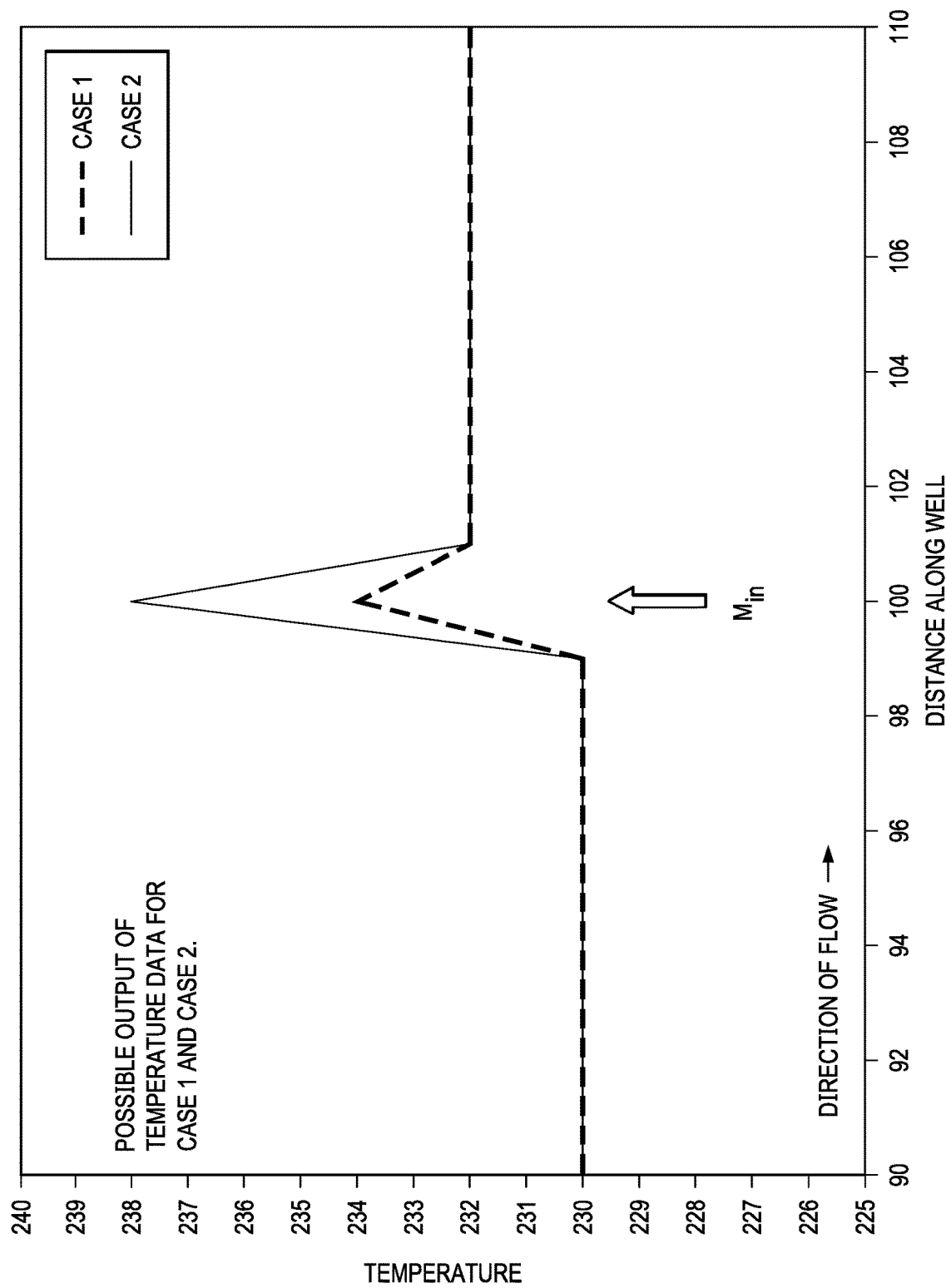

MATRIX TEMPERATURE PRODUCTION LOGGING TOOL AND USE

CROSS-REFERENCE TO RELATED APPLICATIONS

This application is a continuation-in-part of U.S. Ser. No. 14/791,792, filed Jul. 6, 2015, which claims benefit under 35 USC § 119(e) to U.S. Provisional Application Ser. No. 62/021,441 filed Jul. 7, 2014, entitled "MATRIX TEMPERATURE PRODUCTION LOGGING TOOL," each of which is incorporated herein in its entirety.

FIELD OF THE DISCLOSURE

This invention relates to a matrix production logging tool for measuring the temperature of produced fluids along the length of a wellbore and methods of using same to obtain more accurate production information. Since inflow, uphole and downhole measurements are available all along the length and circumference of the wellbore, accuracy is greatly increased.

BACKGROUND OF THE DISCLOSURE

Well logging surveys are often utilized in producing oil and gas wells in order to determine the fraction of oil, gas and unwanted water present in the production interval. This data, along with measurements of the fluid flow velocity (see e.g. FIGS. 3 and 4), cross-section of the well, pressure and temperature may be used to determine production rates and other information from each zone of interest in the well. Such data may be useful for optimizing the well's production, oil recovery, and water shut-off, in order to achieve better reservoir management and to reduce intervention costs. The design and completion methodology of future wells in a given reservoir may also be improved due to available surveys.

Such well logging surveys are typically performed with logging tools. Generally, a logging tool comprises at least one sensor and measures at least one parameter. For example, when measuring temperature within a wellbore or temperature of the produced fluids within a wellbore, a distributed temperature sensor can be mounted to the logging tool.

Distributed temperature sensing (DTS) is a known method of using an optical fiber to sense the temperature along the wellbore. For example, an optical fiber positioned in a section of the wellbore which intersects a producing formation or zone can be used in determining where and how much of known fluids are being produced as long as the fluid entering the wellbore measurably alters the temperature of the fluid already flowing within the wellbore. Temperature response of the produced fluids flowing within the wellbore between inflow locations is used in interpretations to estimate production along with wellbores length. As DTS spatially averages temperature over approximately 1 meter lengths, it cannot provide precise measurements of the inflow temperature of produced fluids.

Logging tools have also included spinner type flow meters with attached temperature sensors that rotate when immersed within a flow stream. However, this type of logging tool has had issues with mechanical reliability. For example, the impeller of the spinner operates on a bearing which wears and requires frequent inspection and replacement to keep frictional effects from influencing the measurements. Another disadvantage, which increases logging time on the well, is that calibration must be done downhole by making several extra logging runs at various logging speeds. In reference to the fluid properties, the spinner speed is not only affected by changes in the velocity of the fluid but also by changes in the viscosity and density of the fluid.

Accurate production allocation to the pathways between the oil/gas well and the reservoir provides required data for the economic optimization of the techniques and procedures used to complete future wells, and can be used in stimulating or remediating an existing well. Thus, a need exists for a reliable, low maintenance tool to provide precise uphole (towards the heel or surface), downhole (towards the toe) and inflow temperature measurements of produced fluids within the wellbore that will be utilized to calculate accurate production levels at each inflow location.

SUMMARY OF THE DISCLOSURE

In one embodiment, a logging tool to determine temperature of produced fluid flowing into or within a wellbore includes: a core structure; an arm extendibly and pivotally mounted to the core structure, the arm is extended away from the core structure and is near the inner surface of the wellbore, wherein the arm pivots in only one plane relative to the core structure; a data transfer device connected to the core structure for receiving and storing data and optionally for doing some or all of the processing too. At least one temperature sensor is attached to the arm, wherein the temperature sensor is located at a tip of the arm, wherein when the arm is extended away from the core structure the temperature sensor is at or near the inner surface of the wellbore.

In another embodiment, a logging tool for use to determine temperature of produced fluid flowing into or within a wellbore includes: a core structure; a plurality of arms extendibly and pivotally mounted to the core structure, at least one arm is extended away from the core structure and is near the inner surface of the wellbore, wherein each arm pivots in one plane relative to the core structure; a data transfer device connected to the core structure for receiving and transmitting data, and optionally for processing and storing it too; and at least one temperature sensor attached to each arm, wherein the temperature sensor is located at a tip of the arm, wherein when the arm is extended away from the core structure the temperature sensor is at or near the inner surface of the wellbore, and preferably even slightly penetrating an inlet, and can thus measure inflow temperatures when passing by the inlet with inflowing fluids.

One embodiment is a method of estimating production rate of fluids produced from a wellbore in a reservoir; the method comprising deploying a matrix logging tool into a wellbore. The matrix logging tool has a core structure; a plurality of arms extendibly and pivotally mounted at a position along the core structure, wherein each arm pivots in only one plane relative to the core structure to extend a tip of each arm to an inner surface of the wellbore; a plurality of temperature sensors attached to the plurality of arms, at least one tip temperature sensor located at a tip of each arm; and a data transfer device inside the core structure for receiving and transmitting temperature data from the temperature sensors. Once fully downhole, or as far as the producing zone to be assessed, the plurality of arms and the temperature sensors are activated (if needed). Then the tool is withdrawn out of the wellbore during production of fluids via inlets in the wellbore, thereby obtaining a matrix of temperature measurements of the fluids from each tip temperature sensor at a plurality of locations in the wellbore.

The matrix consists of inflow, uphole and downhole temperatures for each inlet, unless one is accidently bypassed, which occasionally happens. Thus, a tip temperature sensor determines for a plurality of inlets an inflow temperature of an incoming fluid at an inlet, and tip and/or midarm sensors can provide a downhole temperature immediately downhole of the inlet, and an uphole temperature uphole of the inlet when the temperatures equilibrate. Finally, an integral or separate processor calculates a production rate of fluids entering the wellbore at a plurality of locations based on the matrix of temperature measurements, as described herein.

Another embodiment is a matrix logging tool, having a core structure sized to easily fit in a wellbore, and typically cylindrical. A plurality of arms are extendibly and pivotally mounted at a position along the core structure, wherein each arm pivots in only one plane relative to the core structure to extend a tip of each arm from near the core to an inner surface of the wellbore. Each arm has a temperature sensor at its tip and may also have a midarm sensor, though there may be additional arms with other functions, such as centralizer. An electronic assembly is operably housed inside the core structure for receiving temperature data from the tip temperature sensors. The electronic assembly is operably coupled to a processor for performing calculations using the equation described herein.

A matrix is a collection of numbers arranged into a fixed number of rows and columns. However, as used herein, it refers to a series of up-, down- and inflow temperature measurements taken along the entire length of a production well or producing portion thereof and around its circumference. The sensor readings will typically be continuous, but this is not essential and could be intermittent as long as the frequency of measurement is sufficient to generate $T_{in}$, $T_{up}$ and $T_{down}$ for each inlet or clusters of inlet.

As used herein, to "provide" a well or a fiber optic cable in a well does not necessarily imply that a well is contemporaneously drilled and/or fitted with cable, as one could also select a preexisting well and/or cable to start with.

It is understood that in oil and gas production many independent contractors contribute to the eventual production of hydrocarbon from a reservoir, thus, it is common for different entities to contribute to well logging versus well completion versus well production. Nonetheless, the logging and completion and production activities performed hereunder are clearly for the express purpose of optimizing production, and therefore, be attributed thereto to a single actor even when performed by more than one entity or contractor.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

BRIEF DESCRIPTION OF THE DRAWINGS

The invention, together with further advantages thereof, may best be understood by reference to the following description taken in conjunction with the accompanying drawings in which:

FIG. 6A-D Simulated Temperature Measurements at three locations (FIGS. 6A, 6B, and 6C). These numbers are not real, but exaggerated for simplicity. In reality the temperature spikes would be very small. In addition, $T_{in}$ is shown as cooler, for example where the well itself is heated, but would usually be hotter.

FIG. 6D Energy balance equations for measurements in FIG. 6A-C.

FIG. 7A deploying the tool downhole in the closed configuration. FIG. 7B deploying the arms. FIG. 7C-D pulling the device back uphole and obtaining temperatures while doing so.

FIG. 8C is a closer view of a simulated temperature trace from a logging tool having a tip sensor as herein described that shows the inflow temperature peaks at inflow 100 from the same wells as FIG. 8A-B. Data is unrealistic, but the simplification serves to illustrate the invention.

DETAILED DESCRIPTION OF THE DISCLOSURE

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used in another embodiment to yield a still further embodiment. Thus, it is intended that the present invention cover such modifications and variations that come within the scope of the appended claims and their equivalents.

As previously discussed, capturing the uphole, downhole and inflow temperatures of produced fluids around the inflow mixing point provides a significant amount of data necessary to determine inflowing produced fluid rates along the well so far as there exists a measurable difference between the temperatures of the inflow and uphole fluids. Along with topside metered production rates and compositional data, the total production can be accurately allocated back to each production section of the wellbore by use of the matrix temperature production logging tool described herein, and this wealth of data used in optimization of production.

Figure 1A:
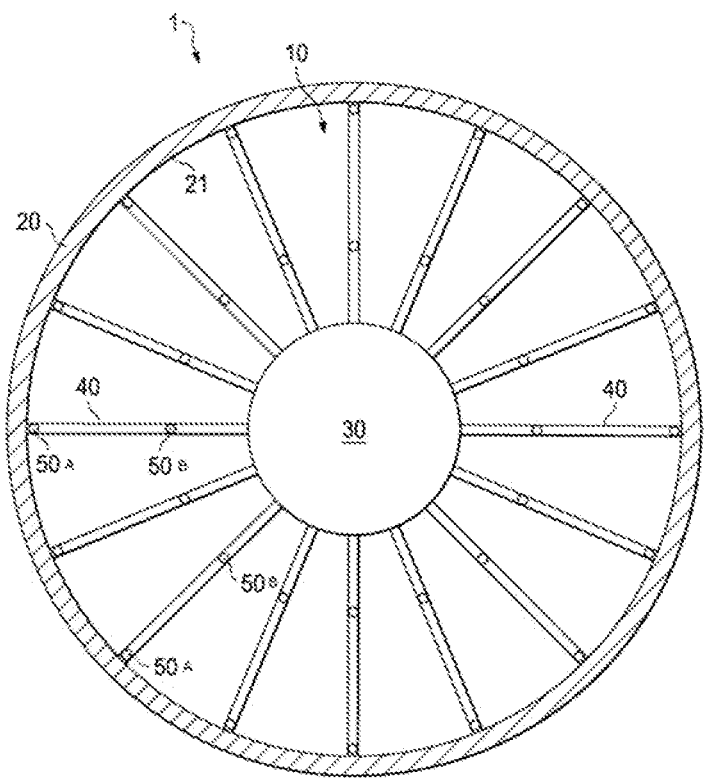
FIG. 1A is a cross-sectional view of the matrix temperature production logging tool disposed within a wellbore, according to one embodiment of the invention having 16 arms, each with a tip sensor 50A and a midstream sensor 50B. These 16 arms measure temperature around the circumference of the well, and it is withdrawn therefrom, and will typically capture temperature data at almost every inflow location.

FIG. 1A is a cross-sectional view that depicts the matrix temperature production log tool 10 disposed within a wellbore 1. The wellbore may be a borehole, a casing or a tubing string. For explanatory purposes, the tool 10 described as being disposed within a tubing string 20. It should be understood, however, that the principles described herein can be applied to many different wellbore structures, i.e., cased or uncased, horizontal or vertical. The tubing string may be horizontal or vertical. The tubing string 20 includes an inner surface 21. The tubing string may also include perforations and/or slots (not seen in this view, but see FIG. 7).

Referring to FIG. 1A, the tool 10 includes a core structure 30, a plurality of arms 40 extendibly and pivotally mounted to the core structure 30 and a plurality of tip temperature sensors 50A and midarm temperature sensors 50B attached to each arm 40. The tool may be centralized within the tubing string through the use of a limited number of additional pivoted arms deployed both uphole and downhole or just uphole or downhole of the temperature sensors.

The tool 10 also includes electronics, such as a computer assembly and/or data transfer device, not shown, that is typically protected inside the core. The electronics are typically disposed within the core structure 30 and function to provide one or more of receiving, processing, storing and/or transmitting electronic signals generated from the tool 10. For instance, the electronics assembly receives electronic signals from the temperature sensors attached to each individual pivoted arm and then stores and/or transmits the data, and may also perform all or part of the processing or calculations. The electronics assembly may also include an electronic clock arrangement, batteries, and other circuits for storage and/or transmitting of data.

Figure 1B:
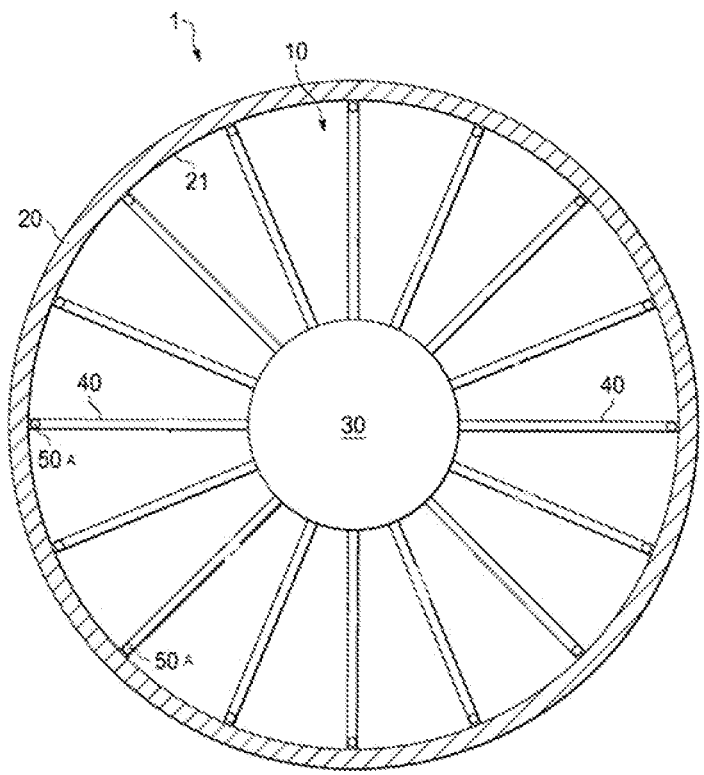
FIG. 1B is a cross-sectional view of the matrix temperature production logging tool disposed within a wellbore, according to a second embodiment of the invention having 16 arms, each with just a tip sensor 50A.

FIG. 1B is an example of a similar tool with only tip sensors 50A.

The tip sensors 50A can easily detect inflow peaks as they pass by an inlet. Up- and downhole temperature differences are smaller and can be located by comparison with multiple tip sensor traces or from a midarm trace. When using a tip-only sensor tool (as in FIG. 1B), a plurality of tip sensors are preferred so that no matter where a perforation is, at least one tip sensor will collect inflow temperature. Downhole is immediately prior to the spike, and uphole is where the various tip sensors again measure the same temperature.

In a tip-and-midarm sensor tool, the downhole temperature can be taken with midarm or tip sensors, as above. Uphole temperature is where midarm and tip sensors again register the same temperature.

In a tip-only sensor tool, lacking midarm sensors, it is preferred that the tool have a number of tip sensors radially spread out (such as 6-24, 10-20, or 16 sensors), as shown in FIG. 1B. In addition, it is preferred that all tip sensors are positioned right adjacent or even slightly inside the inlets, which can be achieved by providing the arms with a slight biasing pressure to the outside and making the sensors small enough to enter an inlet.

The tool can further be coupled to a fiber optic line or wireline (see FIG. 7), which may be deployed inside the wellbore. Data related to the wellbore gathered by the tool may be transmitted in real-time to the surface through the fiber optic line or wireline. The data can also be transmitted real-time via the data transfer device, which may be wireless. However, since the tool is typically deployed via wireline, data transfer to a surface computer (see FIG. 7) via wireline is more likely.

The core structure is kept away from the tubing string to ensure flow around the entire circumference of the core structure. There can be separate centralizers added to the tool, up and/or down hole (or both) of the sensor arms, or the sensor arms themselves may provide a centralizing function. Additionally, by keeping the core structure from contacting the inner surface of the tubing string, the temperature sensors at the tips or ends of the arms are given an opportunity to measure flow from perforations present at those locations where contact between the tool's arm tips and the tubing string inlets occur.

Individual arms or pivoted arms or pivoted rods or slender plates are extendibly pivotally attached to the core structure by a connection member, not shown, such as a pin. The arms do not rotate around the core structure. Rather, each of the arms will only pivot in one plane relative to the core structure (e.g., from adjacent the core to adjacent the inner surface of the casing). Rotation of the arms about the core structure will cause unwanted mixing of the inflow and uphole fluids rendering the temperature measurement at the location of inflow less accurate.

Although the tool 10 in FIG. 1A-B shows sixteen (16) arms, the number of arms attached to the core structure depends on operator need and mechanical feasibility. Any number of arms may radially extend from the core structure, i.e., deploy. Any number of arms (preferably all) may also be in an un-deployed position, wherein the arms are not radially extended from the core structure, as this is beneficial for feeding the tool downwell. The arms can be fastened to the core by any suitable means that allows the arms to pivot away from the core towards the walls of the pipe during deployment, including e.g., hinges, pins, bias springs, springs, pivoting joints, levers, wires, and other extenders.

The pivoted arms may be arranged and configured around the core structure to obtain data from substantially the entire circumferential interior surface of the tubing string. At least one arm must be deployed in order for the temperature sensors to account for the temperature of produced fluid flowing into the tubing string, but preferably, the tool includes a plurality of deployed arms while in use, e.g., 3, 4, 5, 6, 8, 10, 12, 14, 16, 18, 20, 22, 24 or more, depending on the radial inlet pattern in the pipe, as well as on the size of the casing.

Ideally, there are more arms than slots in a given circumference to account for tool or pipe rotation. Where a given arm bypasses a slot, e.g., due to misalignment with the slots, this will be apparent in the trace produced by that arm.

The plurality of pivoted arms are preferably evenly spaced around the circumference of a core structure. When all the pivoted arms are deployed, the probability that a temperature sensor passes directly through the fluid flowing into the well from the reservoir increases. However, if slotted tubing is used, fewer arms may be needed, as slotted tubes typically have several slots around a given circumference.

The arms may be manually or automatically extended or retracted. Each arm also independently responds to the geometric anomalies or other changes in the configuration of the inner surface of the tubing string, such as dents, protrusions, bulges, tortuosity, or bends, hence a bias spring or other outwardly biased connector may be preferred.

The arms can serve as both the mounting structure for a variety of probes, sensors, and flow meters as well, in addition to being a positioning structure for the temperature sensors. They may also serve as centralizers.

Figure 5:
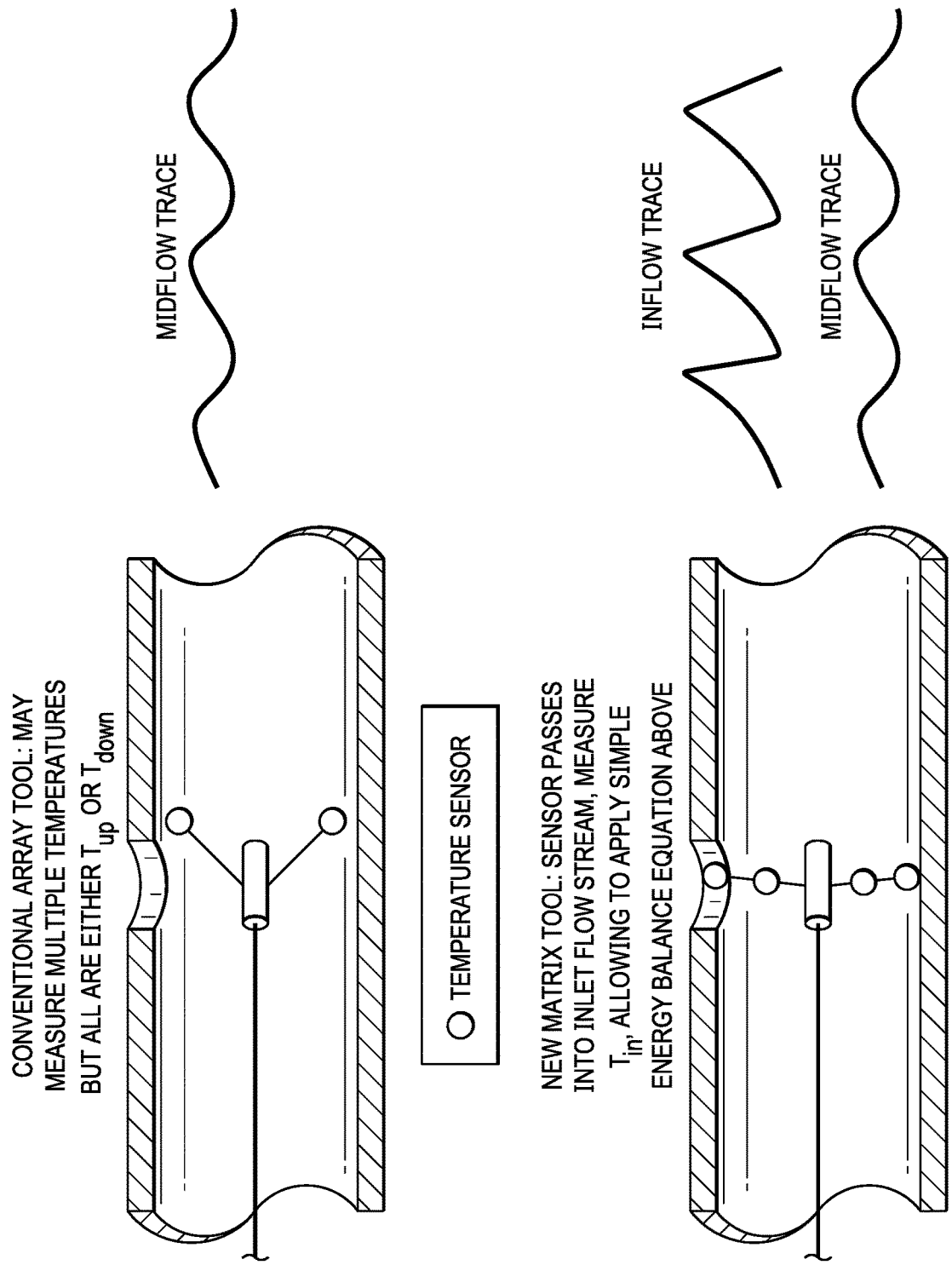
FIG. 5 prior art (top) versus current methodology (bottom), which generates all three temperatures-uphole, inflow and downhole. Typically, though not always, inflow T will be the highest T since the reservoir is usually hotter than the well, and downhole the lowest T, since the oil will cool as it flows, until again heated by the next inflow of hotter oil. Inflow points can thus be determined by the temperature peaks as the tip sensor measures inflowing fluid as it passes an inlet (perforation or slot) in the pipe.

FIG. 1 depicts two temperature sensors 50A-B per arm 40. At least one temperature sensor per arm should be located at the end or tip of the pivoted arm so as to be at or very near the inner surface of the tubing string when the arm is deployed such that inflow temperature can be accurately measured. The tip sensor may even slightly penetrate the slot if the relative sizes are such as to allow same. See e.g., FIG. 5. However, this may be more difficult with slots than holes.

Additional temperature sensors may be mounted on the arms, but they can also be on arms up or downhole of the tip temperature sensors. The tip sensors may also be the sole sensors, as the tip sensor will still pass through all three locations as the device is pulled uphole (uphole of the slot, at the slot and downhole of the slot). However, both midstream and tip sensors may be preferred. The midstream temperature sensors may be mounted between the core structure and the tip of the pivoted arm where the tip temperature sensor is located, or preferably closer to the core. It may be preferably to have a plurality of temperature sensors located along each arm to obtain more complete data about temperature at various radii, but this may not be needed.

The temperature sensors record the temperature of produced fluid flowing into and within the tubing string. Temperature sensors can include, but are not limited to, resistive temperature sensing devices, thermocouples, thermistors, infrared, capacitance thermometer, pressure of known encased fluid, and laser or laser light within fiber optics. Other types of sensors can also be incorporated into the arms, such as sensors to determine the fluid phase(s) would provide further information that would enhance the allocation of production data.

Figure 2:
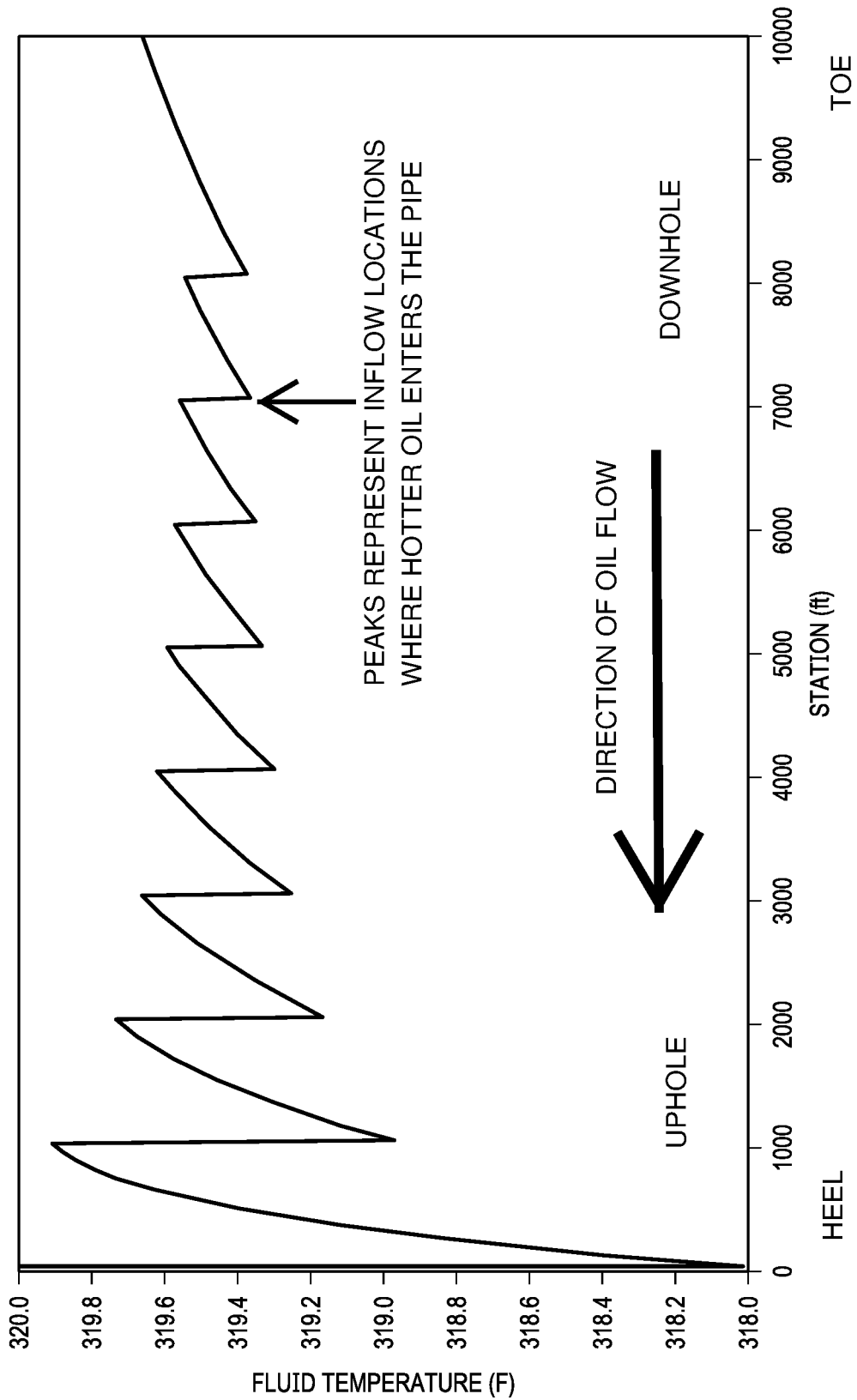
FIG. 2 is a simulated plot of a horizontal well temperature trace for a single tip sensor, each spike in T indicating an inflow location as the incoming oil is typically hotter than that of the pipe. Here the tool is pumped downhole with a bolus of fluid, e.g., brine, so the initial temperatures are cooler, the overall temperature increasing as the oil continues uphole (to the left).
Figure 3:
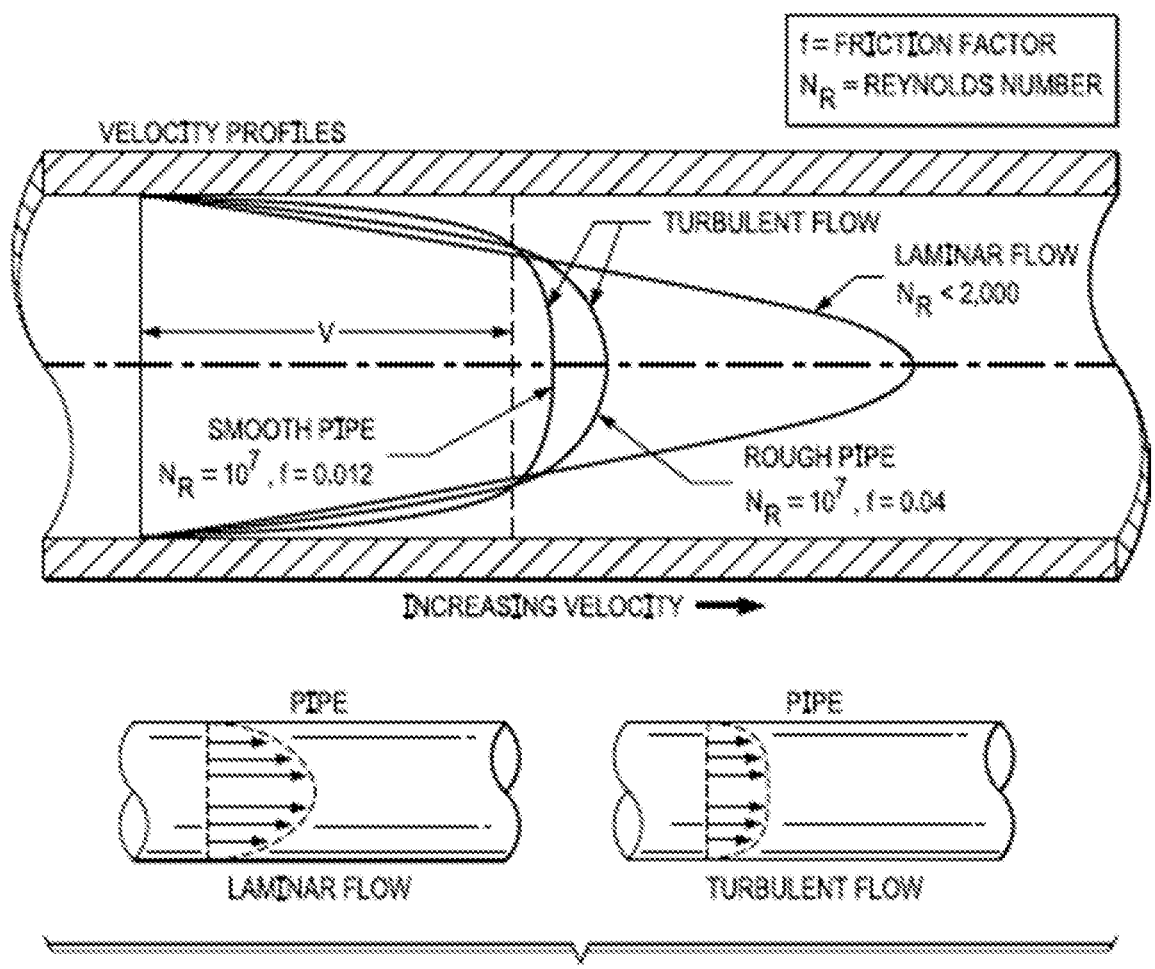
FIG. 3 displays velocity profiles through a pipe.
Figure 4:
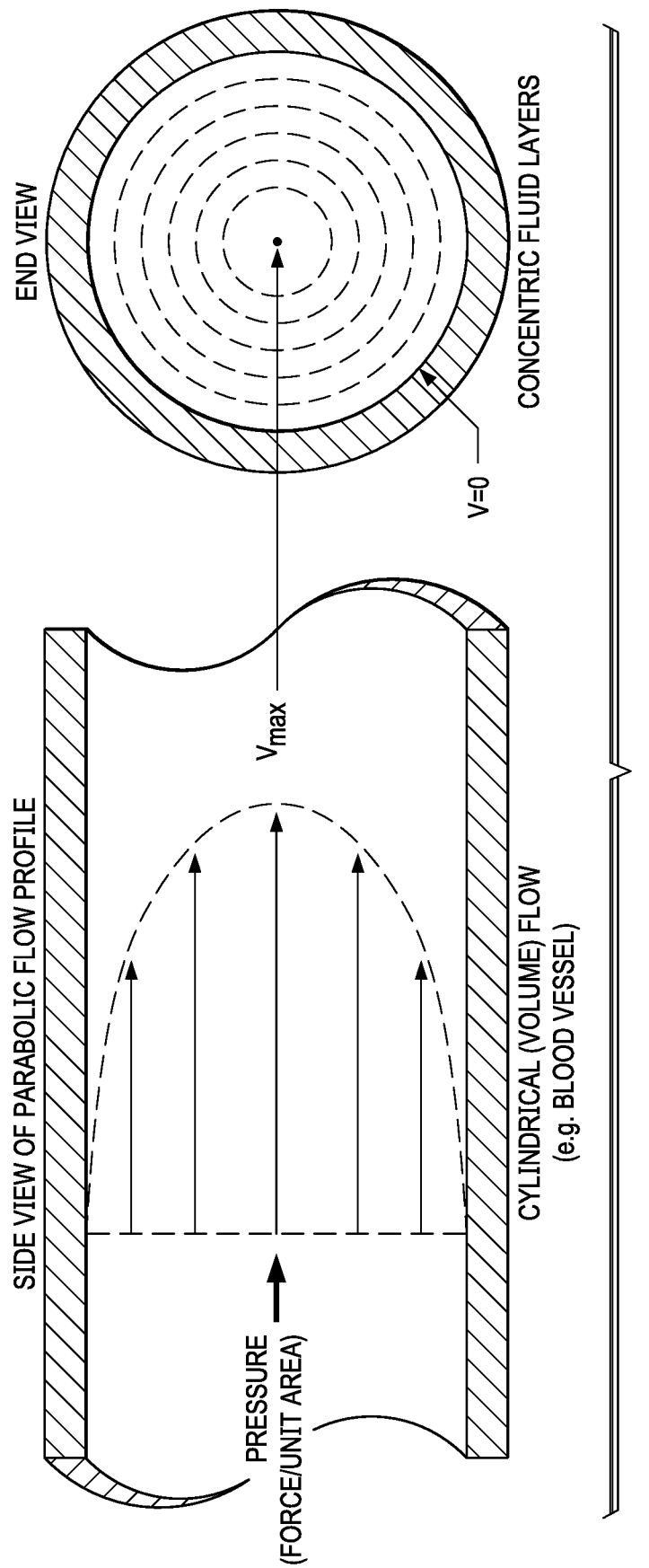
FIG. 4 displays a side view of a parabolic flow profile.

FIG. 2 depicts a simulated plot of a single trace of temperature from a tip sensor of simulated production fluid through a 10,000 foot horizontal tubing string with a total production rate of 500 barrels of oil per day. There were nine (9) inflow locations (see peaks) where equal amounts of produced fluid were flowing into the wellbore. The temperature data from the simulation was used to confirm that if three temperatures ($T_{in}$ at the peaks, $T_{up}$ to the left of peaks but of uncertain value since there is only one trace shown, $T_{down}$ immediately to the right of peaks) around each inflow location could be measured, then production could be allocated to each location.

In use, the matrix logging tool is deployed deep into a production well, and the arms deployed and the tool withdrawn during production so that temperature traces along the well length may be obtained. Sensors at the tip are oriented to face the inflow and because they are at the tip of the arms, proximate the inlets (and even entering the inlets if suitably sized), they allow accurate measurement of the incoming fluid temperature before it mixes with the fluids inside the pipe. A temperature trace of the entire well can thus be generated as the tool is pulled out of the well, either in a continuous slow motion with continual traces, or in a series of intermittent moves and/or intermittent measurements, as desired.

Figure 6A:
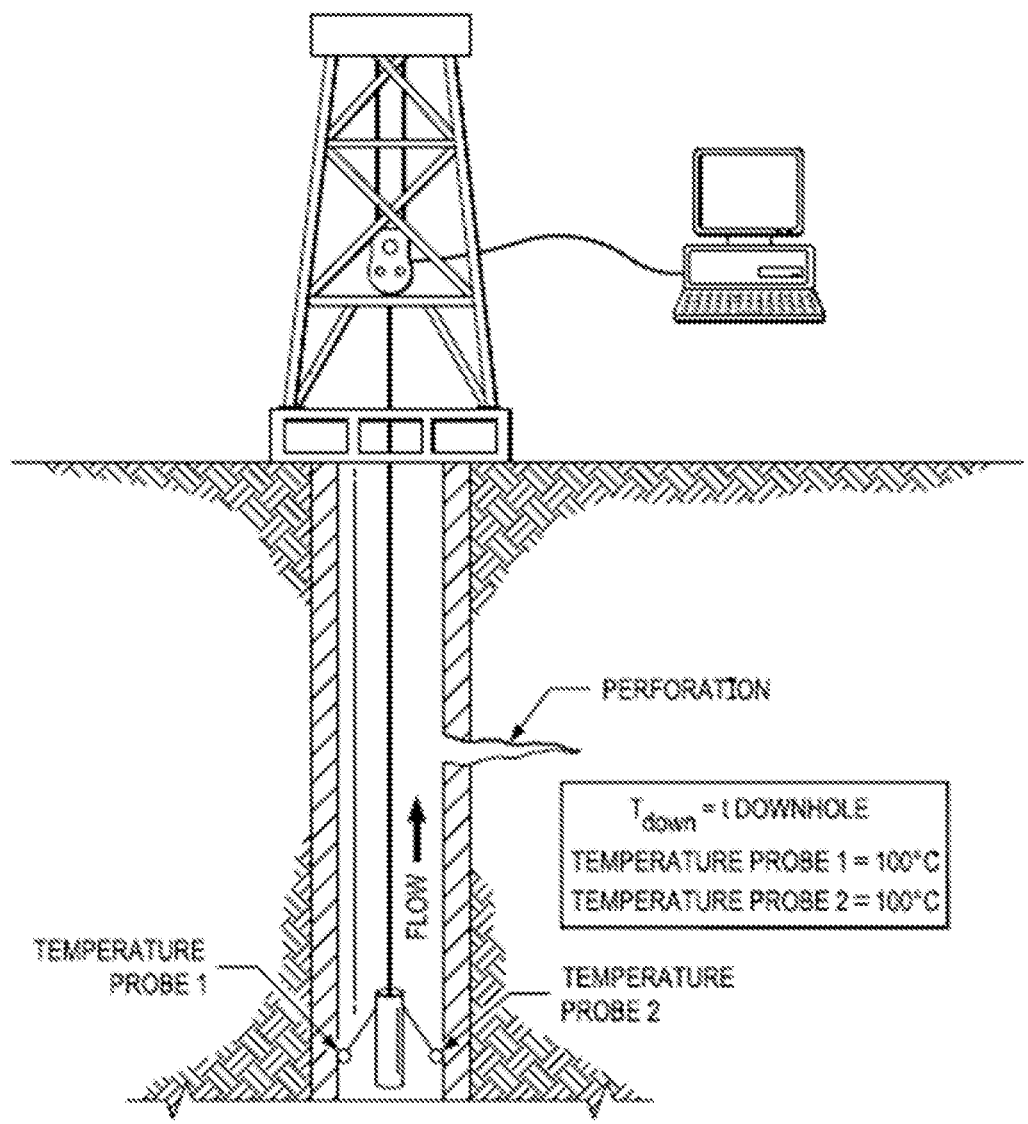
Figure 6B:
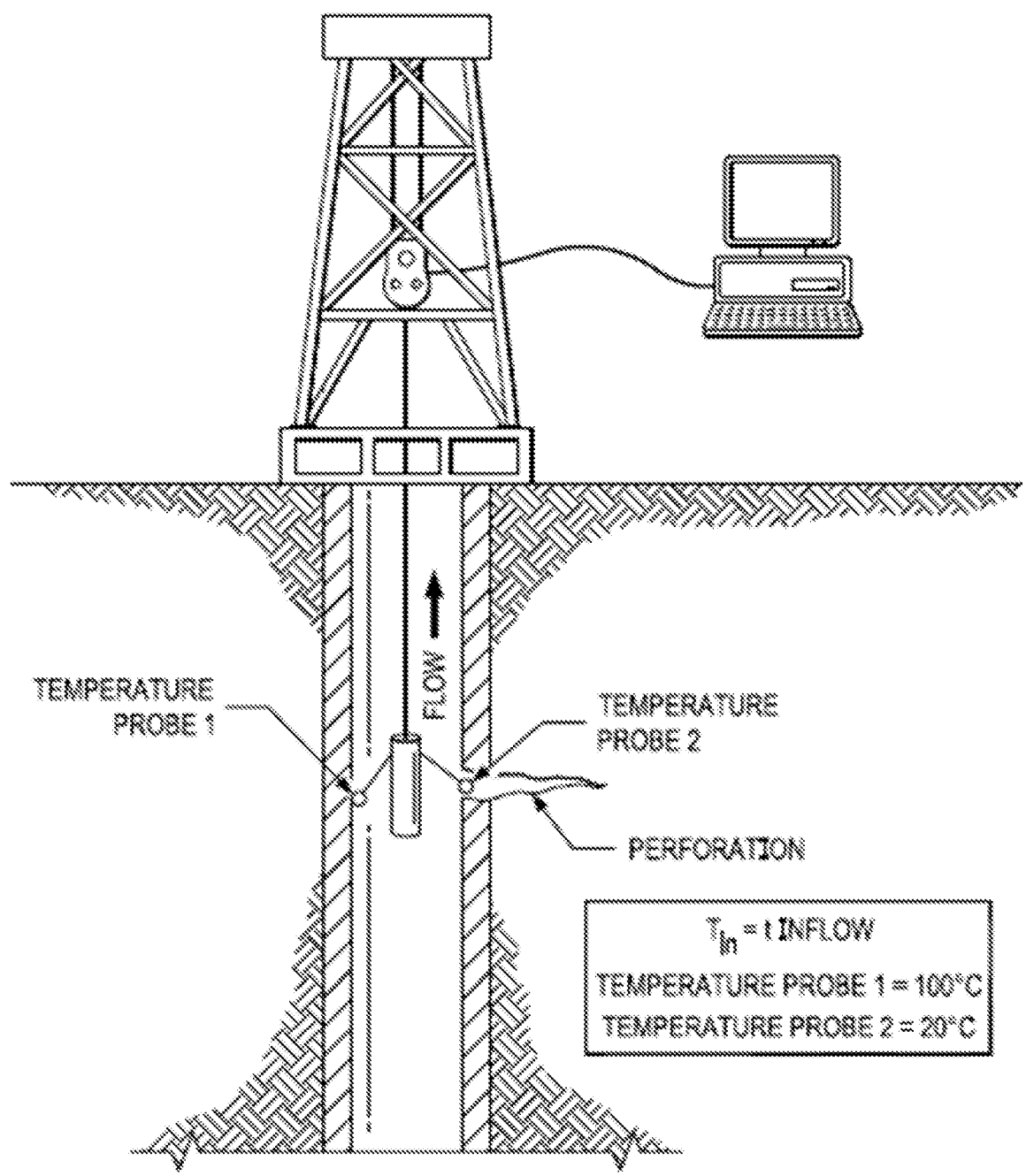
Figure 6C:
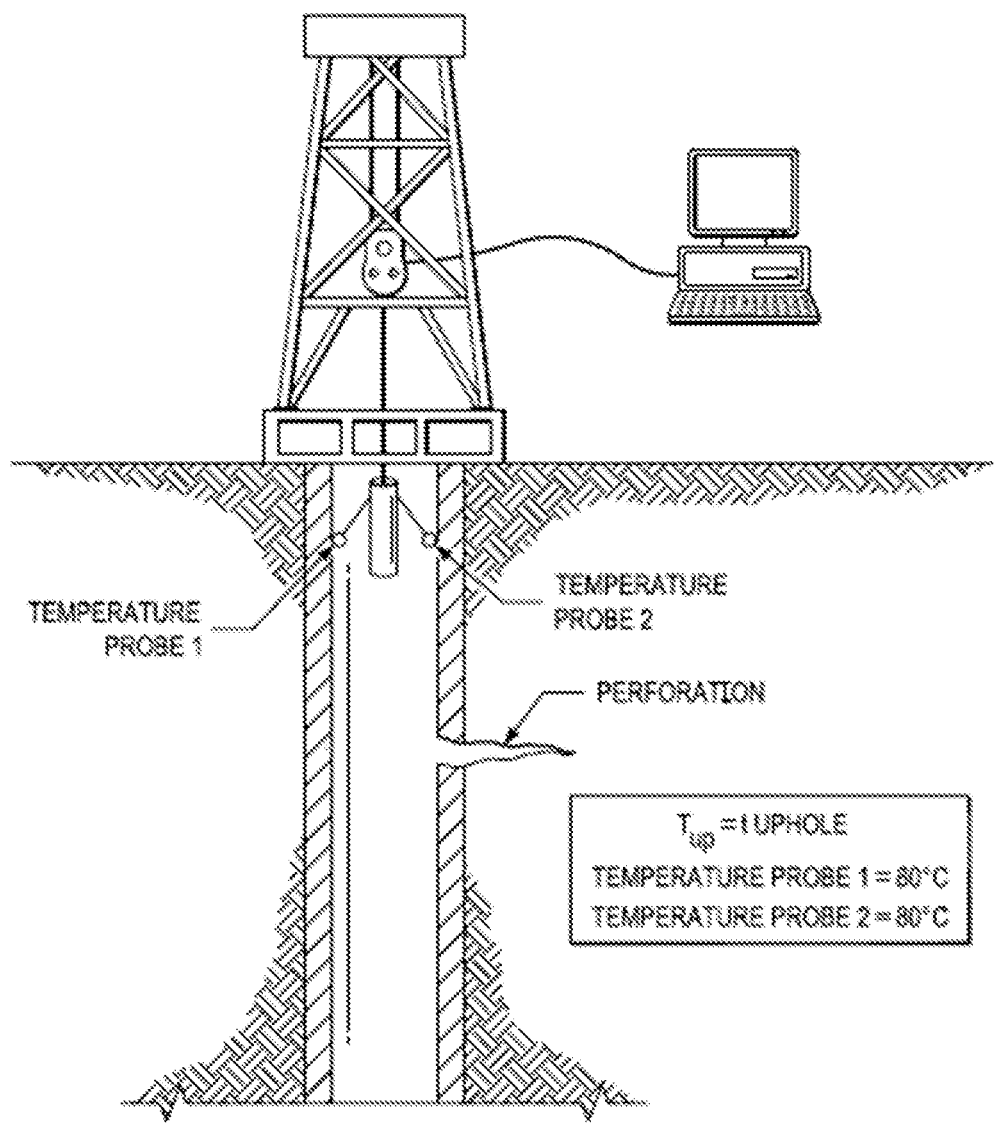

The prior art sensors, by contrast, measured only midstream temperatures. See FIG. 5 top and FIG. 8A-B, whereas the current device has tip sensors that can sit right in the inflow from a slot or perforation as they pass thereby, measuring temperature before any mixing has occurred. FIG. 6 bottom.

Sensors in the middle of the arm(s) can measure both up- and downhole temperatures, and these can be located by comparison with a trace from the tip sensor, where clear temperature spikes (see temperature traces in FIG. 5) indicate where the inflow regions are. By definition then, downhole is immediately in front of the peak, and the uphole temperature is where temperature between a tip and a midarm sensors are the same, or where a plurality of tip sensors again measure the same temperature.

By having all three uphole ($T_{up}$), incoming ($T_{in}$), and downhole ($T_{down}$) temperatures, we are now able to calculate the exact mass contribution (M) from that step in the matrix as shown in FIG. 6D, wherein:

$$M_{in}/M_{up}=(T_{down}-T_{up})/(T_{down}-T_{in}),$$

Where M=mass and T is temperature.

Figure 7A:
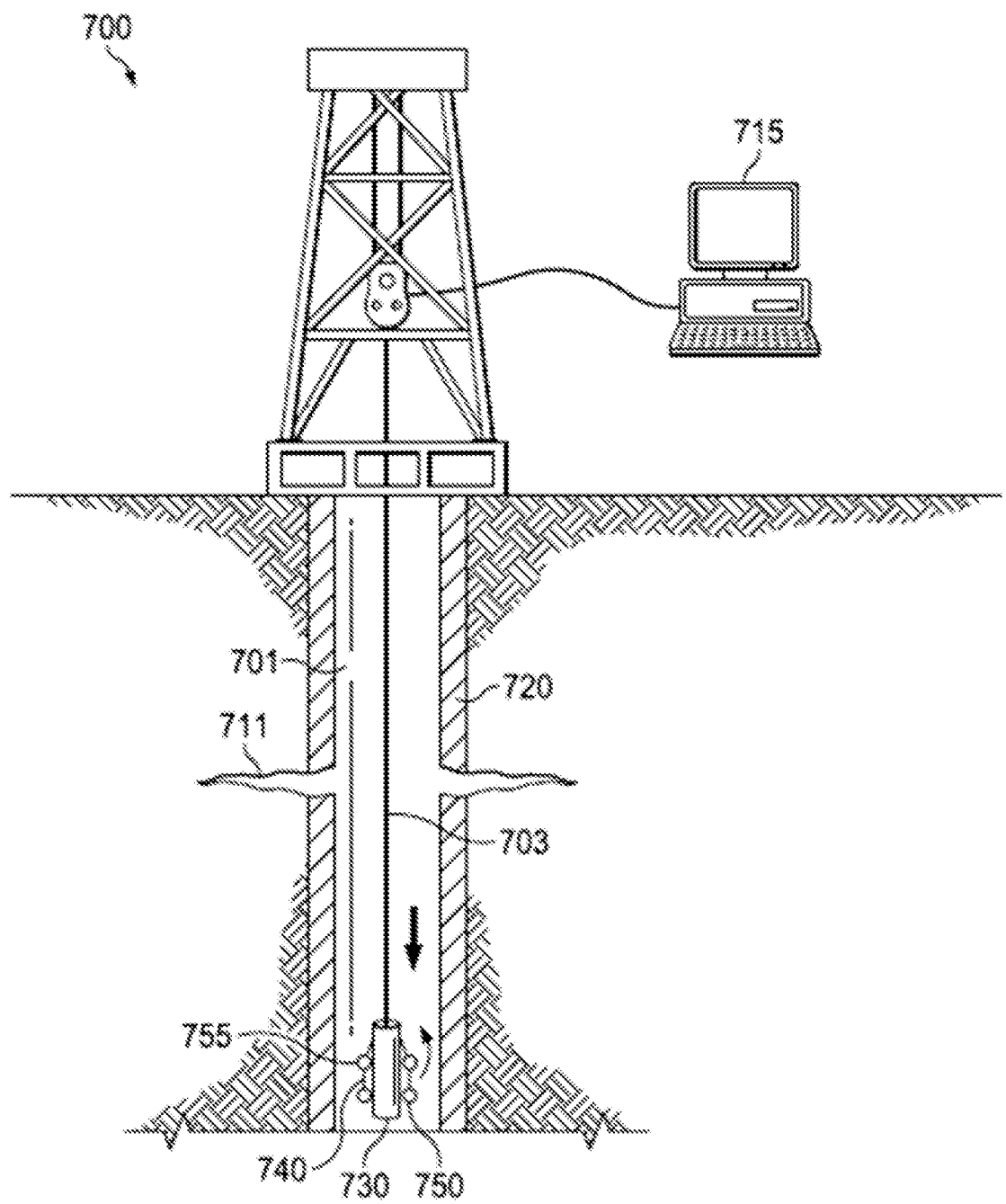
FIG. 7A-D. Matrix logging tool in use downhole measuring temperature during production.
Figure 7B:
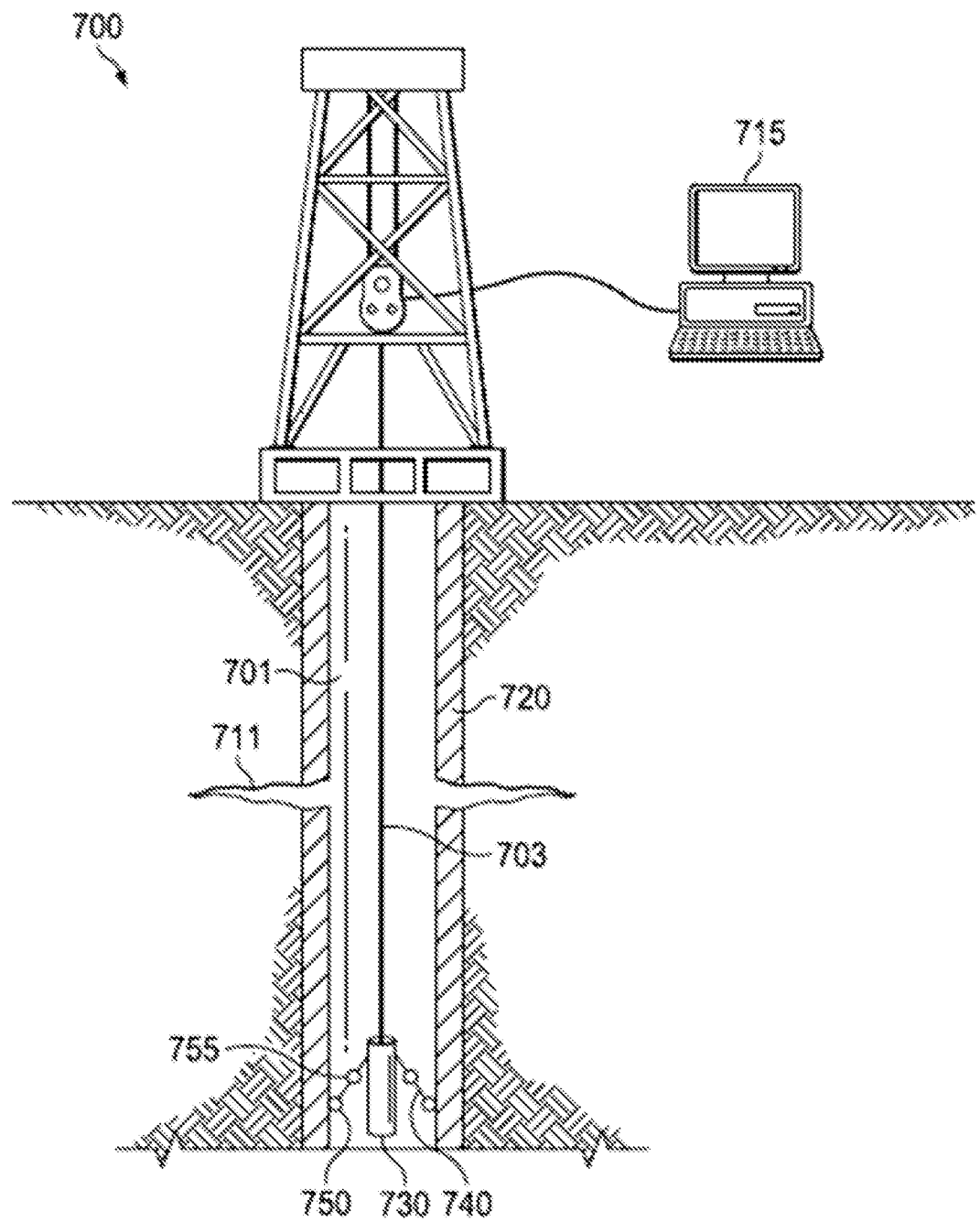

In FIG. 7A we see the matrix temperature logging tool 700 being deployed deep down well 701 via wireline 703 with arms 740 pulled up against body 730. Once deployed as deep downhole as needed, typically at or near the bottom of a production zone, the arms 740 are deployed away from body 730, as in FIG. 7B in any suitable manner including electrical or mechanical means. The tips can thus reach to the inner surface of the casing 720.

Figure 7C:
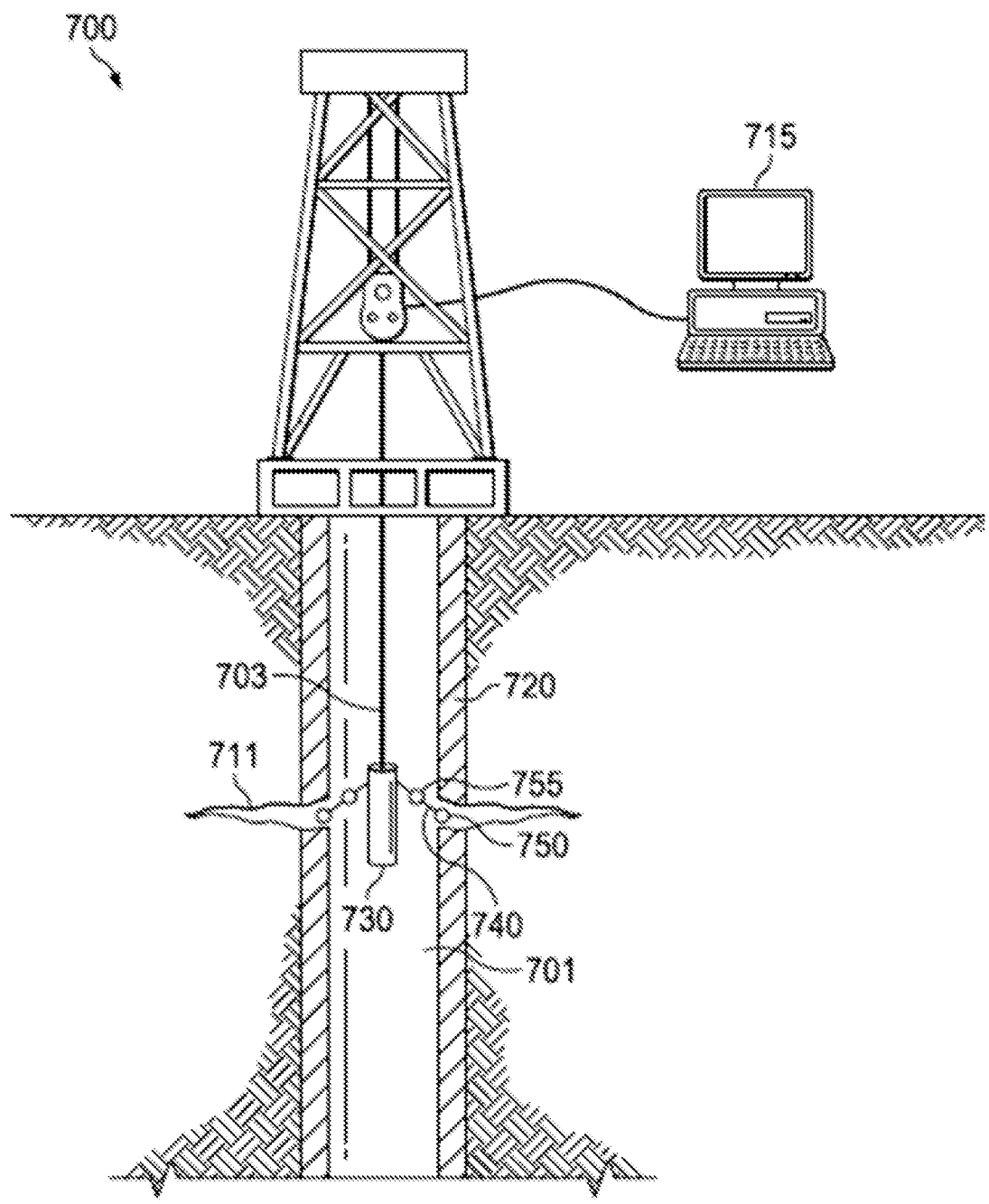
Figure 7D:
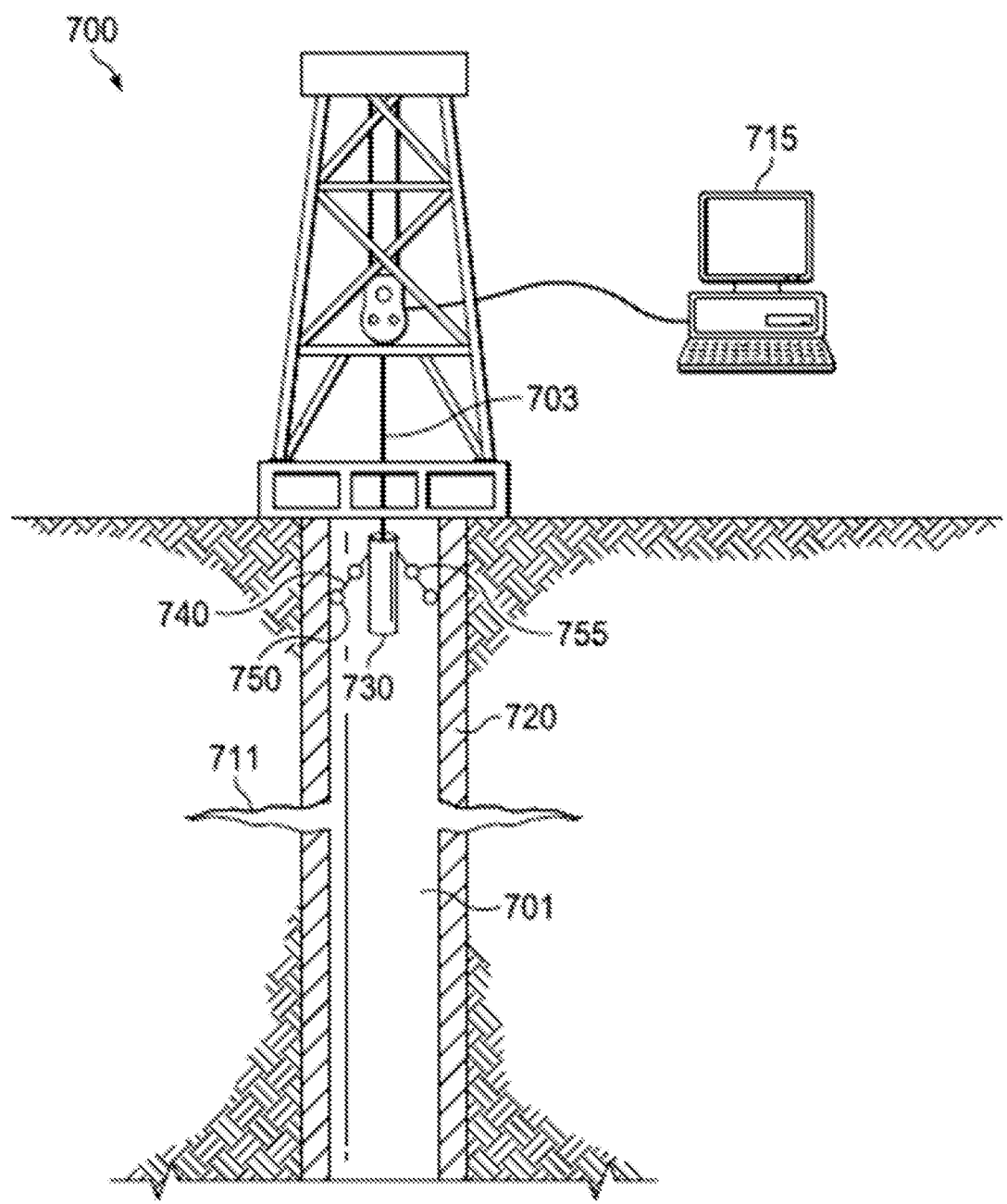

As the tool is slowly pulled up hole in FIG. 7C and D during production, the tip sensors 750 will pass by perforations 711 (only one location shown for simplicity) and record incoming fluid temperature. The midarm sensor 755 will record up- and downhole temperatures, and these can be located by comparison to temperature peaks in the tip sensor trace. The data is sent to a recorder/processor/data transfer device 715 in body 730, which will record and possibly analyze the data or perform some preliminary conversions, then the data is sent uphole to a surface computer/processor/ display/storage unit 717 which will perform any remaining analysis and display and/or store of the data or send it to another processor.

Figure 8A:
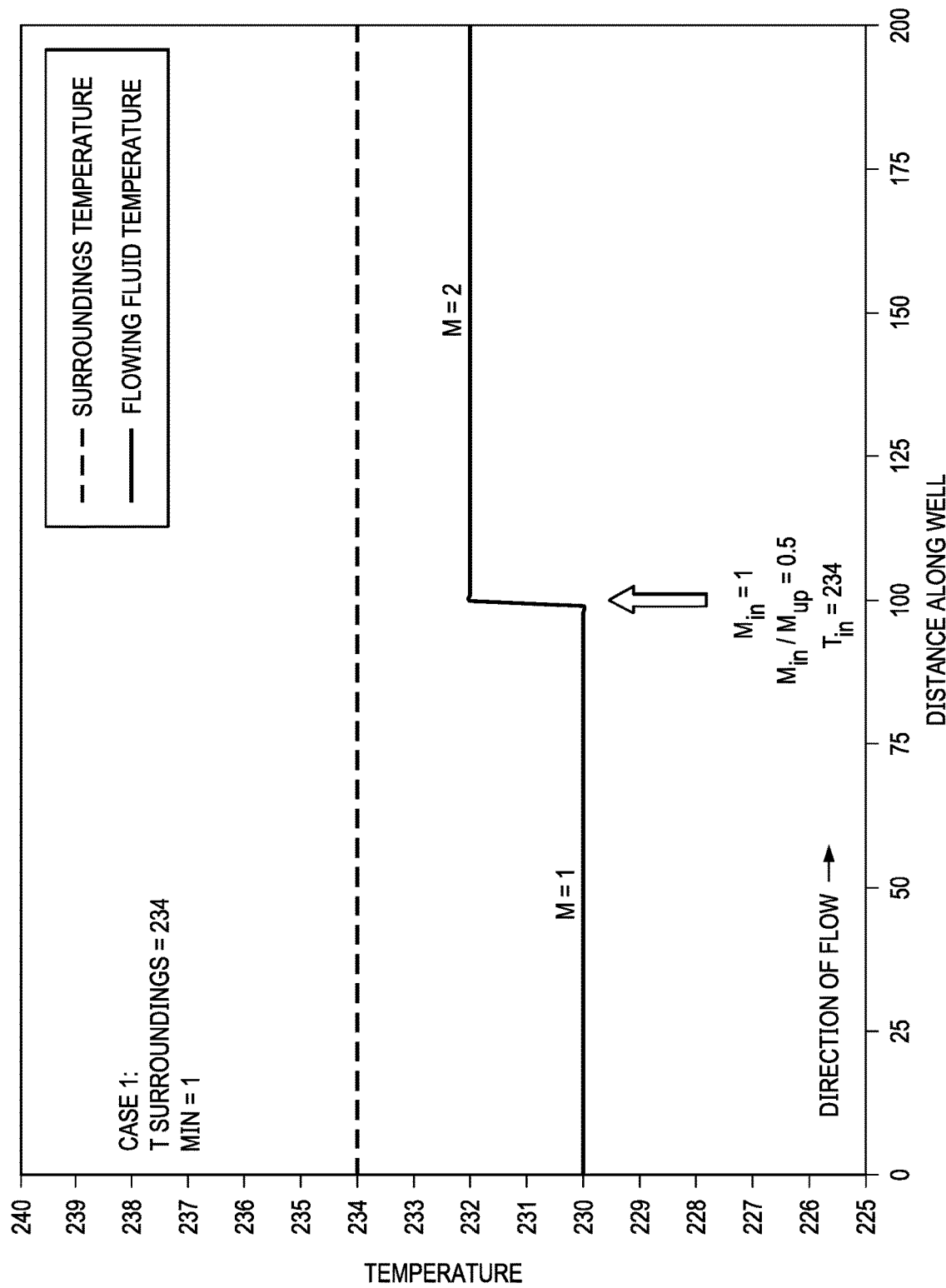
FIG. 8A Simulates a 200 meter long well with a single inlet at 100. This not a temperature trace using the tool of the invention, but would be exemplary of the prior art tools. Thus, no inflow peak is seen. Data is unrealistic, but the simplification serves to illustrate the prior art.
Figure 8B:
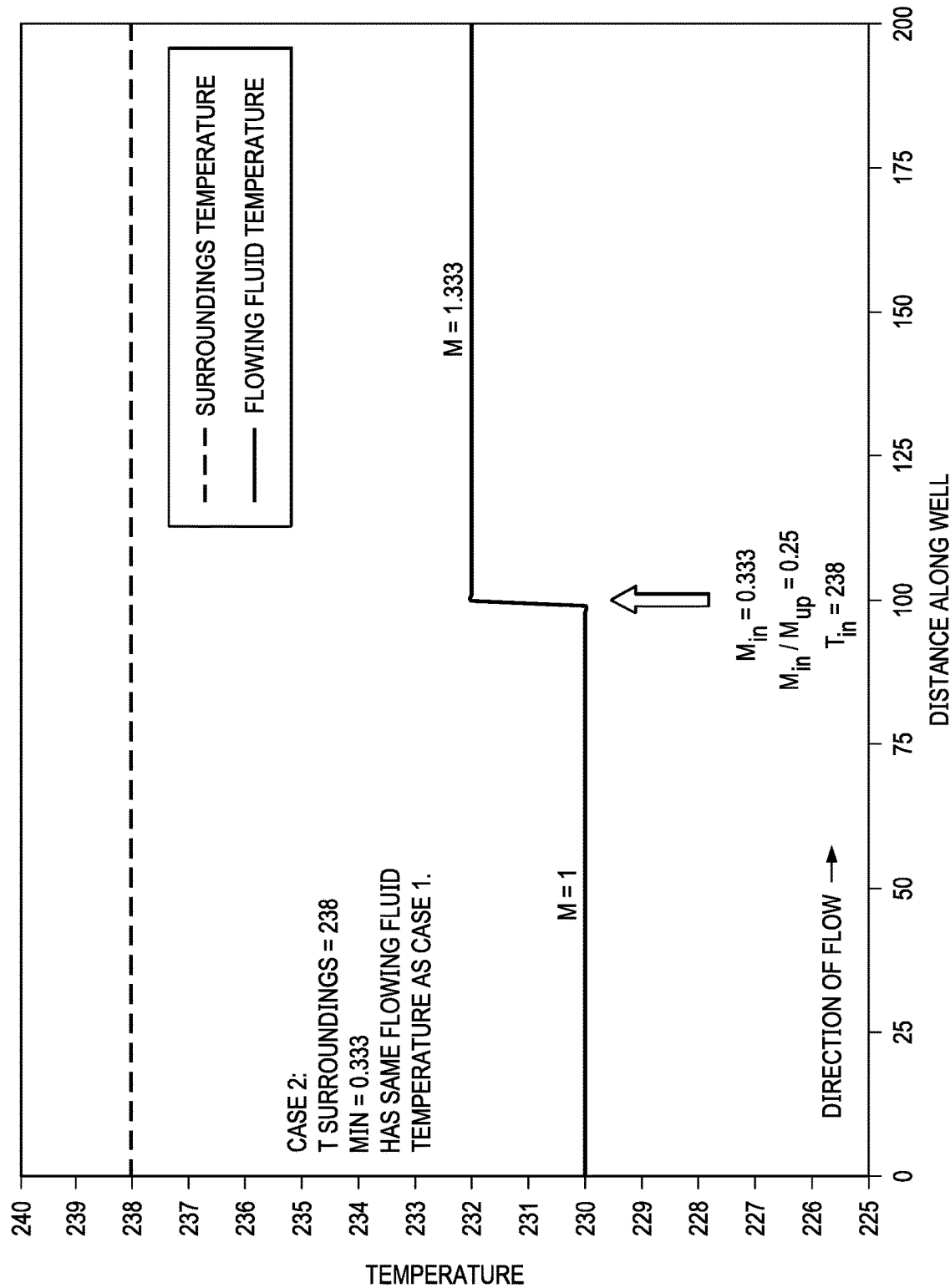
FIG. 8B Simulates a 200 meter long well with inlet at 100 of a slightly hotter reservoir.

FIG. 8A-B show a prior art temperature trace, albeit simulated and highly simplified. FIG. 8C shows the same two wells using the temperature logging tool described herein, and the inflow peaks are clearly visible.

Figure 9:
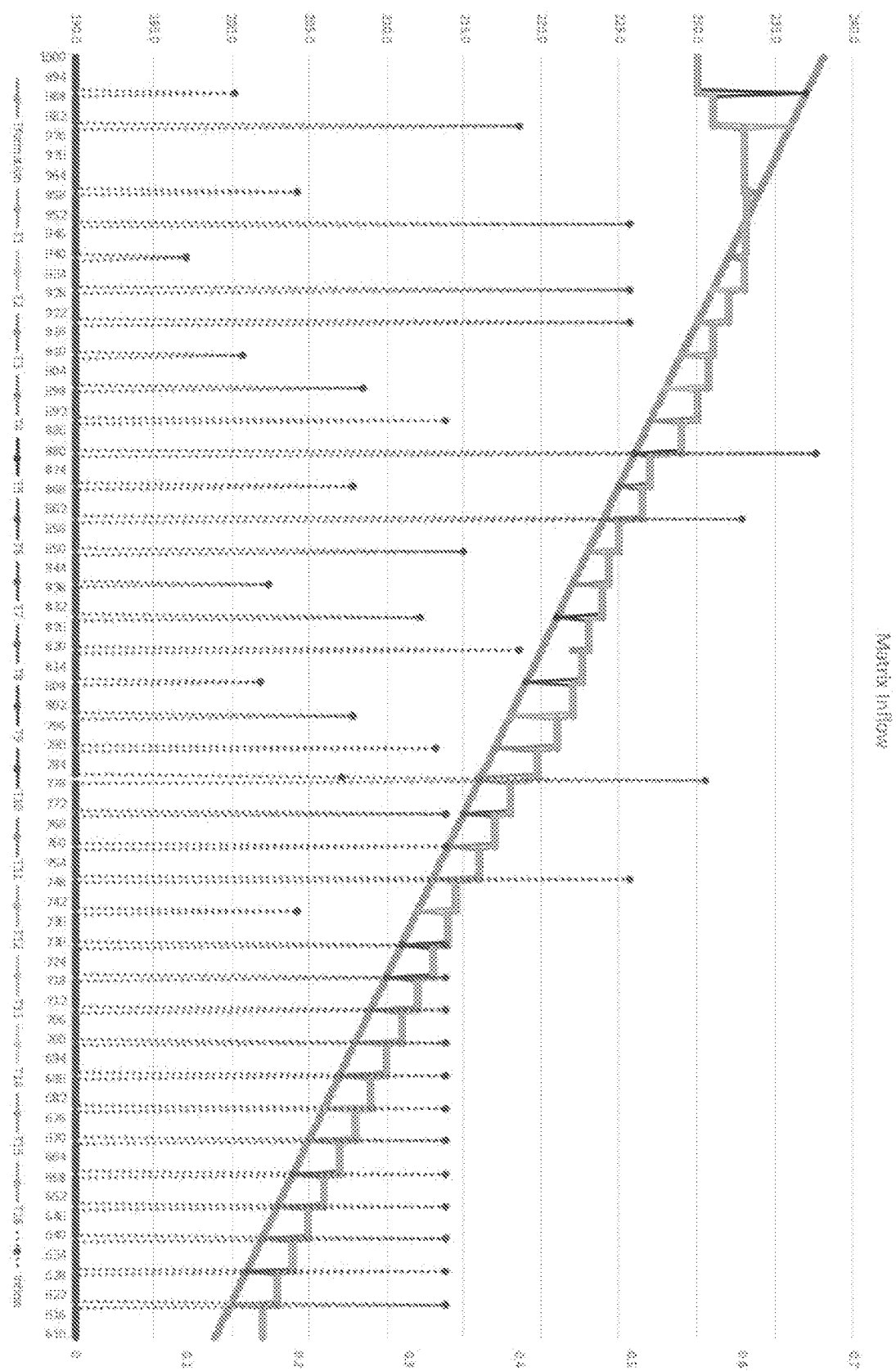
FIG. 9 shows more realistic simulated data from a vertical well, starting at depth 1000 m going to 610 m (the sensor collects data as the tool is pulled out of the well) collected with 16 tip sensors (T1-T16) arranged radially about the circumference of the tool, all 16 at the same length of tool so that all tips are at the same depth. Dashed line is reservoir temperature (° C., axis on left), shown increasing with depth (m, axis on bottom). Min/Mup is shown in dotted line, axis on the right. Each sensor is given in a different color and the overlay is black.

FIG. 9 shows more realistic, but still simulated, data from a vertical well collected with 16 tip sensors equidistance radially from each other and all at the same depth. The dashed line is reservoir temperature, and the various colors indicate the tip sensors, one of which measures a peak of inflow at reservoir temperature, e.g., at 988 m, 978, 958, etc. Starting from downhole on the left, at each inlet, a peak is seen, bringing the temperature somewhat higher. At 950 feet, however, the temperature of flow inside the tube is somewhat hotter than reservoir temperature, but that is because of the hotter fluid that already entered the pipe further downhole. As the tool travels uphole, the overall temperature continues to drop, but it lags somewhat behind the reservoir temperature drop. From $T_{in}$, $T_{up}$ and $T_{down}$, the mass balances are calculated, giving the $M_{in}/M_{up}$ shown in dotted upward peaks at each inflow location.

Generating accurate production data along the length of the well allows the operator to more accurately determine which areas provide good flow and which have impeded or poor flow. This information can be used to optimize the well by e.g., changing the completion, stimulating one or more zones by fracturing, washing, acid stimulating, and the like, adding flow control devices, and the like.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method of estimating production rate of fluids produced from a wellbore in a reservoir; said method comprising:
 a. deploying a matrix logging tool into a wellbore, said matrix logging tool comprising:
  i. a core structure;
  ii. a plurality of arms exteridibly and pivotally mounted at a position along said core structure, wherein each arm pivots in only one plane relative to the core structure to extend a tip of said each arm to an inner surface of said wellbore;
  iii. a plurality of temperature sensors attached to said plurality of arms, at least one tip temperature sensor located at a tip of each arm;
  iv. a data transfer device inside said core structure for receiving and transmitting temperature data from said temperature sensors;
 b. deploying said plurality of arms to reach said wellbore;
 c. withdrawing said matrix logging tool out of said wellbore during production of fluids via inlets in said wellbore, thereby obtaining a matrix of temperature measurements of said fluids from each tip temperature sensor at a plurality of locations and a plurality of inlets in said wellbore, wherein a tip temperature sensor determines an inflow temperature of an incoming fluid at an inlet, a downhole temperature immediately downhole of said inlet, and an uphole temperature uphole of said inlet;
 d. calculating an estimated production rate of fluids entering said wellbore at said plurality of locations based on said matrix of temperature measurements.

2. The method of claim 1, wherein said calculating step uses the following equation:

$$M_{in}/M_{up}=(T_{down}-T_{up})/(T_{down}-T_{in}),$$

wherein M is mass and T is temperature, and wherein $M_{in}$ is a mass of fluids at an inflow position, $M_{up}$ is a mass of fluids uphole of said inflow position, $T_{down}$ is a temperature downhole of said inflow position, $T_{up}$ is a temperature uphole of said inflow position, and $T_{in}$ is a tip temperature at said inflow position.

3. The method of claim 1, wherein said arms are outwardly biased and said tip temperature sensors are smaller than said inlets, such that a tip temperature sensor is configured to at least partially enter said inlet.

4. The method of claim 1, wherein said withdrawing is continuous and said temperature measurements are continuous.

5. The method of claim 1, wherein said temperature sensors are selected from a group consisting of a resistive temperature sensing device, thermocouple, thermistor, infrared, capacitance thermometer, pressure of known encased fluid, laser or laser light within fiber optics.

6. The method of claim 1, wherein the data transfer device transfers data from the core to a processor on a surface of said reservoir, and said processor performs said calculating-step.

7. The method of claim 1, wherein the data transfer device transfers data from the core to a processor at a surface of said reservoir via a wireline operably coupled to said matrix logging tool.

8. The method of claim 1, wherein said data transfer device is operably coupled to a processor inside said core, and said processor performs said calculating step.

9. The method of claim 1, wherein an uphole temperature is taken when all temperature sensors measure the same temperature after passing an inlet.

10. The method of claim 1, said matrix logging tool further comprising one or more midarm sensors on one or more of said plurality of arms between said tip and said core.

11. A method of estimating production rate in a wellbore in a reservoir, said method comprising:
 a. deploying a matrix logging tool into a wellbore in a reservoir, said matrix logging tool comprising:
  i. a core structure:
  ii. a plurality of arms pivotally mounted at a position along said core structure, wherein each arm pivots in only one plane relative to the core structure to extend a tip of each arm from near said core to an inner surface of said wellbore;

iii. a plurality of tip temperature sensors attached to said plurality of arms at a tip of each arm;
iv. a data transfer device operably housed inside said core structure and operably coupled to said temperature sensors, said data transfer device capable of receiving and transmitting temperature data from said temperature sensors;
v. said data transfer device operably coupled to a processor for performing calculations;

b. extending said plurality of arms to meet said inner surface of said wellbore;

c. pulling said matrix logging tool out of said wellbore during production of fluids via a plurality of inlets in said wellbore, thereby obtaining a matrix of temperature measurements of said fluids at a plurality of locations from each tip temperature sensor, wherein each tip temperature sensor determines an inflow temperature of an incoming fluid at an inlet as determined by a temperature spike at each inlet, a downhole temperature immediately prior to said inlet, and an uphole temperature uphole of said inlet where all temperature sensors reach a same temperature;

d. receiving said matrix of temperature measurements at said data transfer device and, transferring said matrix of temperature measurements to said processor; and e. said processor calculating an estimated plurality of production rates at said plurality of locations based on said matrix of temperature measurements using the following equation: $M_{in}/M_{up}=(T_{down}-T_{up})/(T_{down}-T_{in})$, wherein M is mass and T is temperature, and wherein M is a mass of fluids at an inflow position, $M_{up}$ is a mass of fluids uphole of said inflow position, $T_{down}$ is a temperature downhole of said inflow position, $T_{up}$ is a temperature uphole of said inflow position, and $T_{in}$ is a tip temperature at said inflow position.

12. The method of claim 11, wherein said data transfer device transfers data to said processor located at a surface of a reservoir.

13. The method of claim 11, wherein the data transfer device transfers data to said processor located in said core.

14. A matrix logging tool, said matrix logging tool comprising:
a. a core structure;
b. a plurality of arms extendibly and pivotally mounted at a position along said core structure, wherein each arm pivots in only one plane relative to the core structure to extend a tip of said each arm from near said core to an inner surface of said wellbore;
c. a plurality of tip temperature sensors attached to said plurality of arms, a tip temperature sensor on a tip of each arm;
d. an electronic assembly operably housed inside said core structure for receiving temperature data from said tip temperature sensors and for transmitting said data to a processor;
e. said electronic assembly operably coupled to a processor for performing calculations using the following equation:
$M_{in}/M_{up}=(T_{down}-T_{up})/(T_{down}-T_{in})$, wherein M is mass and T is temperature, and wherein $M_{in}$ is a mass of fluids at an inflow position, $M_{up}$ is a mass of fluids uphole of said inflow position, $T_{down}$ is a temperature downhole of said inflow position, $T_{up}$ is a temperature uphole of said inflow position, and $T_{in}$ is a tip temperature at an inflow position.

15. The matrix logging tool of claim 14, wherein each arm is outwardly biased.

16. The matrix logging tool of claim 14, wherein each arm is outwardly biased and each tip temperature sensor is selected to be smaller than an inlet such that it is configured to partially penetrate said inlet.

* * * * *